(12) United States Patent
Tsai et al.

(10) Patent No.: US 7,184,007 B2
(45) Date of Patent: Feb. 27, 2007

(54) BACKLIGHT DEVICE OF A LCD DISPLAY

(76) Inventors: Yi-Hung Tsai, No. 12, Alley 2, Lane 239, Ming Sheng Road, Hsinchu City 300 (TW); Hung-Yang Kuo, 1F, No. 328, Lane 1050, Ming Hu Road, Hsinchu City 300 (TW); Shyuan-Jeng Ho, 4F, No. 10, Lane 172, Kuang Hua 2nd Street, Hsinchu CIty 300 (TW)

( * ) Notice: Subject to any disclaimer, the term of this patent is extended or adjusted under 35 U.S.C. 154(b) by 374 days.

(21) Appl. No.: 10/396,785

(22) Filed: Mar. 26, 2003

(65) Prior Publication Data

US 2004/0032388 A1 Feb. 19, 2004

(30) Foreign Application Priority Data

Aug. 16, 2002 (TW) ................................ 91118516 A

(51) Int. Cl.
*G09G 3/00* (2006.01)

(52) U.S. Cl. .............................. 345/87; 345/1.1; 345/5; 349/62; 349/65; 358/484; 362/26; 385/901

(58) Field of Classification Search ................. 345/1.1, 345/5, 87; 349/62, 65, 70; 358/484; 359/256; 362/26, 31, 223, 327; 385/146, 901

See application file for complete search history.

(56) References Cited

U.S. PATENT DOCUMENTS

| | | | | |
|---|---|---|---|---|
| 5,856,819 A | * | 1/1999 | Vossler | 345/102 |
| 6,020,944 A | * | 2/2000 | Hoshi | 349/62 |
| 6,095,673 A | * | 8/2000 | Goto et al. | 362/582 |
| 6,108,060 A | * | 8/2000 | Funamoto et al. | 349/65 |
| 6,144,424 A | * | 11/2000 | Okuda et al. | 349/65 |
| 6,425,673 B1 | * | 7/2002 | Suga et al. | 362/613 |
| 6,447,136 B1 | * | 9/2002 | Liu et al. | 362/625 |
| 6,464,366 B1 | * | 10/2002 | Lin et al. | 362/616 |
| 6,494,585 B1 | * | 12/2002 | Wada | 362/26 |
| 2001/0001595 A1 | * | 5/2001 | Hosseini et al. | 362/31 |
| 2001/0048405 A1 | * | 12/2001 | Salley | 345/30 |

(Continued)

FOREIGN PATENT DOCUMENTS

JP 06-243826 9/1994

(Continued)

*Primary Examiner*—Bipin Shalwala
*Assistant Examiner*—Vincent E. Kovalick
(74) *Attorney, Agent, or Firm*—Quintero Law Office

(57) ABSTRACT

A many-faceted LCD display, comprising a light guide pipe, a light source, a first optical means, a second optical means, a first LCD panel and a second LCD panel, is disclosed. The light guide pipe comprises a first surface capable and optional of attaching a reflector, a second surface capable and optional of attaching a reflector, a first edge, and a second edge capable and optional of attaching a reflector. The light source is provided at the first edge and capable of generating and emitting light into the light guide pipe. The first optical means is provided on the first surface of the light guide pipe, and the second optical means is provided on the second surface of the light guide pipe. The first LCD panel is provided on the first optical means, and the second LCD panel is provided on the second optical means.

17 Claims, 3 Drawing Sheets

U.S. PATENT DOCUMENTS

| | | | |
|---|---|---|---|
| 2002/0097353 A1* | 7/2002 | Lee | 349/58 |
| 2002/0109805 A1* | 8/2002 | Baba | 349/65 |
| 2002/0126086 A1* | 9/2002 | Takeuchi et al. | 345/156 |
| 2002/0142151 A1* | 10/2002 | Ochiai et al. | 428/328 |
| 2002/0172039 A1* | 11/2002 | Inditsky | 362/231 |

FOREIGN PATENT DOCUMENTS

| | | |
|---|---|---|
| JP | 08-240720 | 9/1996 |
| JP | 2001-174630 | 6/2001 |
| JP | 2001-290445 | 10/2001 |
| JP | 2002-133927 | 5/2002 |
| JP | 2002-189230 | 7/2002 |

* cited by examiner

BACKLIGHT DEVICE OF A LCD DISPLAY

BACKGROUND OF THE INVENTION a. Field of the Invention

The present invention is related to a backlight device of a LCD display, more particularly, to a dual-faceted LCD display or a triple-faceted LCD display with only single backlight device.

b. Description of Prior Art

The LCD (Liquid Crystal Display), used as a display device, is mounted in a variety of electronic devices. A laptop (or notebook) personal computer is a typical electronic device employing a large-size liquid display screen. There is competition to develop thinner and lighter screens at larger sizes.

FIG. 1 shows a cross-sectional view of the conventional LCD display. The LCD display comprises a light guide pipe 10, a light source 12, the first optical means 20, and the first LCD panel 40.

The light guide pipe 10 is wedge-shaped or plane, comprising the first surface 10a and the second surface 10b. A reflector 15 is provided on the first surface 10a of the light guide pipe 10. The light guide pipe 10 is generally made of an acrylic resin, and has a dot pattern formed on its inner surfaces which can make the light from the light source 12 uniform over the second surface 10b.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10. The light is then propagated and reflected repeatedly in the light guide pipe 10, and emitted over its second surface 10b.

The first optical means 20 is provided on the second surface 10b of the light guide pipe 10, and applied to make the light emitted from the light guide pipe 10 uniform. The first optical means 20 is generally composed of the first diffuser 21, the first light converting film 22, the second light converting film 23, and the second diffuser 24. The first LCD panel 40 is then provided on the first optical means 20 for displaying images.

Recently, more and more electronic products need more than two LCD display, such as a dual-faceted or triple-faceted LCD display on a cell phone or a PDA (Personal Digital Assistant). At present, however, two (three) backlight devices are needed for a dual-faceted (triple-faceted) LCD display. It not only largely increases the cost of production, but also makes the LCD display bulky. It thus violates the trend to make the LCD display thinner and brighter.

Accordingly, there exists a need in the LCD display field for an improved arrangement which provides a thinner and brighter dual-faceted or triple-faceted LCD display with low production cost.

SUMMARY OF THE INVENTION

It is an object of the present invention to provide a backlight device of a LCD display.

It is another object of the present invention to provide a backlight device for a dual-faceted LCD display.

It is also another object of the present invention to provide a backlight device for a triple-faceted LCD display.

It is also another object of the present invention to provide a dual-faceted LCD display with only single backlight device.

It is also another object of the present invention to provide a triple-faceted LCD display with only single backlight device.

A many-faceted LCD display, comprising a light guide pipe, a light source, a first optical means, a second optical means, a first LCD panel and a second LCD panel, is disclosed. The light guide pipe comprises a first surface capable and optional of attaching a reflector, a second surface capable and optional of attaching a reflector, a first edge, and a second edge capable and optional of attaching a reflector. The light source is provided at the first edge of the light guide pipe and capable of generating and emitting light Into the light guide pipe. The first optical means is provided on the first surface of the light guide pipe, and the second optical means is provided on the second surface of the light guide pipe. The first LCD panel is provided on the first optical means, and the second LCD panel is provided on the second optical means. Light is emitted over the first surface and the second surface of the light guide pipe and passes the first optical means and the second optical means.

In one embodiment of the present invention, there is no reflector provided on the first surface or the second surface of the light guide pipe. Therefore, both the first LCD panel and the second panel can display images with only single light source.

In another embodiment of the present invention, there is a reflector provided on the first part of the second surface of the light guide pipe, but there is no reflector provided on the first surface of the light guide pipe. Therefore, both the first LCD panel and the second panel can display images with only single light source.

In another embodiment of the present invention, there is a reflector provided on the first part of the first surface of the light guide pipe, but there is no reflector provided on the second surface of the light guide pipe. Therefore, both the first LCD panel and the second panel can display images with only single light source.

In another embodiment of the present invention, there is a reflector provided on the first part of the first surface of the light guide pipe, and there is a reflector provided on the first part of the second surface of the light guide pipe. Therefore, both the first LCD panel and the second panel can display images by using only single light source.

In another embodiment of the present invention, there is a semi-opaque reflector provided on the second surface of the light guide pipe, but there is no reflector provided on the first surface of the light guide pipe. Therefore, both the first LCD panel and the second panel can display images by using only single light source.

In another embodiment of the present invention, there is no reflector provided on the first surface, the second surface or the second edge of the light guide pipe. Therefore, all the first LCD panel, the second panel, and the third panel can display images by using only single light source.

DESCRIPTION OF THE PREFERRED EMBODIMENTS

The present invention is related to a backlight device of a LCD display, more particularly, to a dual-faceted LCD display or a triple-side LCD display by using a single backlight device. The key feature of the present invention is to direct the light emitted from a single backlight device to two or more directions.

The backlight device of the present invention can be applied to any kind of LCD device, such as TFT-LCD or STN-LCD, and so on. The backlight device of the present invention can be applied to any kind of electronic products, such as Notebook computers or PDAs (Personal Digital Assistants), and so on.

Figure 1:
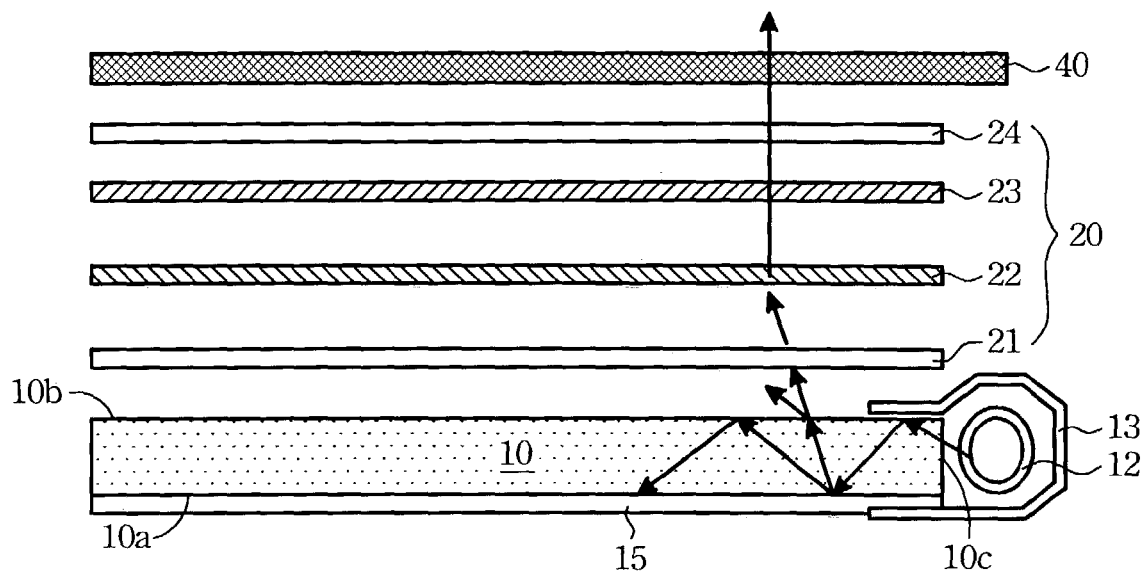
FIG. 1 shows a cross-sectional view of the conventional LCD display.
Figure 2:
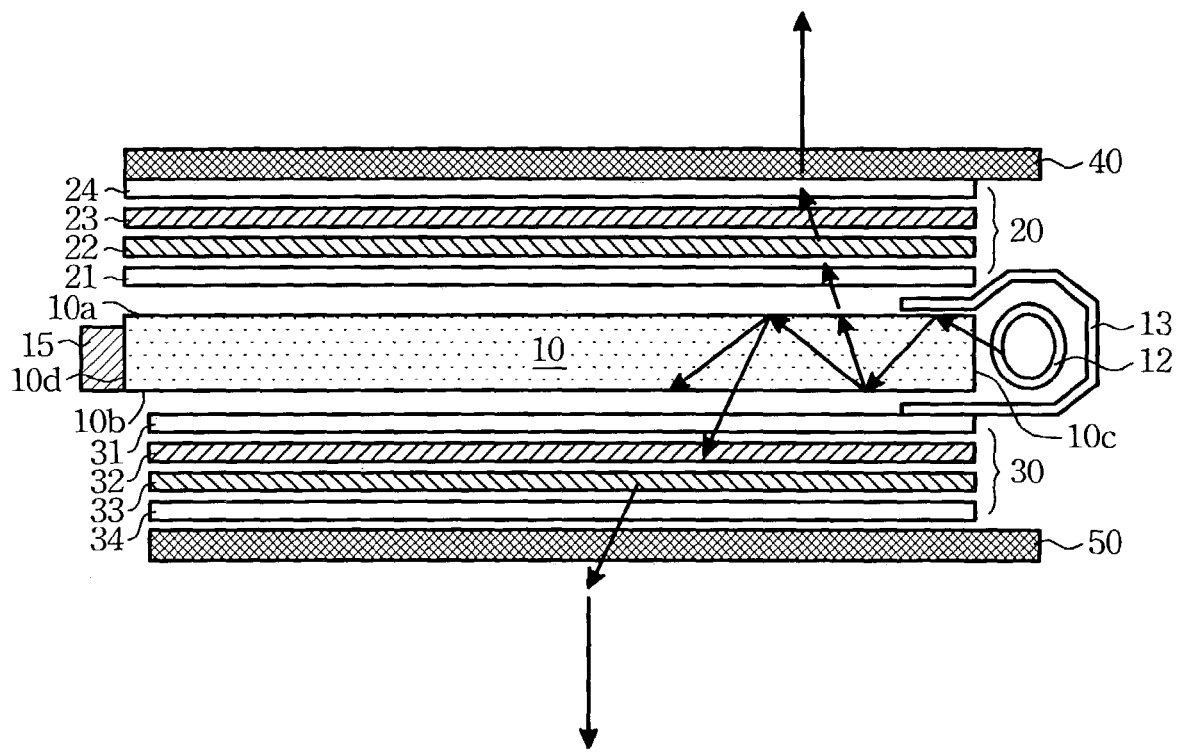
FIG. 2 shows a schematic cross-sectional diagram of the first embodiment of the dual-faceted LCD display of the present invention.

Please refer first to FIG. 2, which is a schematic cross-sectional diagram of the first embodiment of the dual-faceted LCD display of the present invention. The dual-faceted LCD display is composed of a light guide pipe 10, a light source 12, a first optical means 20, a second optical means 30, a first LCD panel 40, and a second LCD panel 50.

The light guide pipe 10 is wedge-shaped or plane, comprising a first surface 10a, a second surface 10b, a first edge 10c, and a second edge 10d. According to the present invention, people can optionally choose whether a reflector 15 is attached on the first surface 10a, the second surface 10b, or the second edge 10d of the light guide pipe 10 or not. In other word, each one of the first surface 10a, the second surface 10b, and the second edge 10d of the light guide pipe 10 is capable and optional of attaching a reflector, depending on people's choice. The light guide pipe 10 is generally made of an acrylic resin or the like, and has a dot pattern formed on its inner surfaces which can make the light from the light source 12 uniform over the first surface 10a and the second surface 10b.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10.

In the first embodiment of the present invention, there is no reflector 15 provided on the first surface 10a or the second surface 10b of the light guide pipe 10, but there is one reflector provided on the second edge 10d of the light guide pipe 10. Therefore, the light from the light source 12 is propagated and reflected repeatedly in the light guide pipe 10, and then emitted over its first surface 10a and second surface 10b both.

The first optical means 20 is provided on the first surface 10a of the light guide pipe 10, and applied to make the light emitted from the light guide pipe 10 uniform. The first optical means 20 is generally composed of a first diffuser 21, a first light converting film 22, a second light converting film 23, and a second diffuser 24. The first diffuser 21 and the second diffuser 24 are made of a polymer film or the like for diffusing the light. The first light converting film 22 and the second light converting film 23 are prisms which can convert and focus the light.

The second optical means 30 is provided on the second surface 10b of the light guide pipe 10, and applied to make the light emitted from the light guide pipe 10 uniform. The second optical means 30 is generally composed of a first diffuser 31, a first light converting film 32, a second light converting film 33, and a second diffuser 34. The first diffuser 31 and the second diffuser 34 are made of a polymer film or the like for diffusing the light. The first light converting film 32 and the second light converting film 33 are prisms which can convert and focus the light.

The first LCD panel 40 is provided on the first optical means 20 and served as the first monitor. On the other side, the second LCD panel 50 is provided on the second optical means 30 and served as the second monitor. According to the present embodiment, there is no reflector 15 provided on the first surface 10a or the second surface 10b of the light guide pipe 10, so the light from the light source 12 can be emitted from the first surface 10a and the second surface 10b both. Therefore, both the first LCD panel 40 and the second panel 50 can display images.

Figure 3:
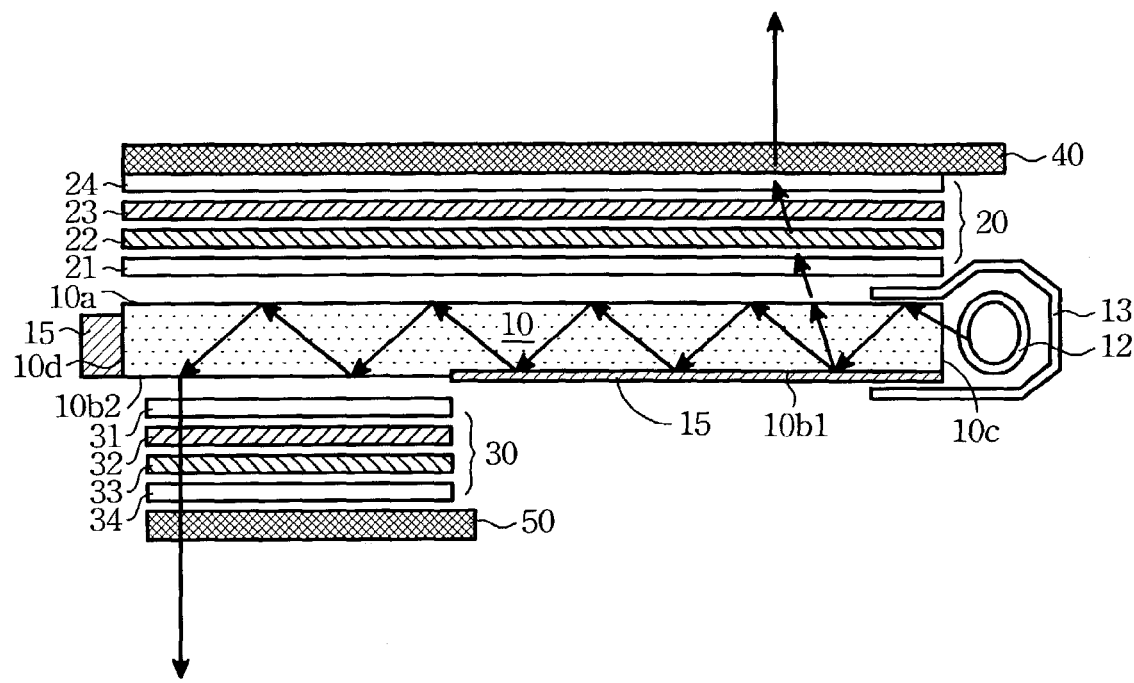
FIG. 3 shows a schematic cross-sectional diagram of the second embodiment of the dual-faceted LCD display of the present invention.

Please refer then to FIG. 3, which is one schematic cross-sectional diagram of the second preferred embodiment of the dual-faceted LCD display of the present invention. The dual-faceted LCD display in this embodiment is composed of a light guide pipe 10, a light source 12, a first optical means 20, a second optical means 30, a first LCD panel 40, and a second LCD panel 50.

The light guide pipe 10 is wedge-shaped or plane, comprising a first surface 10a, a second surface 10b, a first edge 10c, and a second edge 10d. According to the present invention, people can choose whether a reflector 15 is provided on the first surface 10a, the second surface 10b, or the second edge 10d of the light guide pipe 10 or not. In other word, each one of the first surface 10a, the second surface 10b, and the second edge 10d of the light guide pipe 10 is capable and optional of attaching a reflector, depending on people's choice. The light guide pipe 10 is generally made of an acrylic resin or the like, and has a dot pattern formed on its inner surfaces which can make the light from the light source 12 uniform over the first surface 10a and the second surface 10b.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10.

In the second embodiment of the present invention, there is no reflector 15 provided on the first surface 10a of the light guide pipe 10. However, on the other hand, there is one reflector 15 provided on the first part 10b1 of the second surface 10b of the light guide pipe 10. Furthermore, there is also one reflector 15 provided on the second edge 10d of the light guide pipe 10. Therefore, the light from the light source 12 is propagated and reflected repeatedly in the light guide pipe 10, and emitted over the first surface 10a and the second part 10b2 of the second surface 10b.

The first optical means 20 is provided on the first surface 10a of the light guide pipe 10, and applied to make the light emitted from the light guide pipe 10 uniform. The first optical means 20 is generally composed of a first diffuser 21, a first light converting film 22, a second light converting film 23, and a second diffuser 24. The first diffuser 21 and the second diffuser 24 are made of a polymer film or the like for diffusing the light. The first light converting film 22 and the second light converting film 23 are prisms which can convert and focus the light. The second optical means 30 is provided on the second part 10b2 of the second surface 10b of the light guide pipe 10, and applied to make the light emitted from the light guide pipe 10 uniform. The second optical means 30 is generally composed of a first diffuser 31, a first light converting film 32, a second light converting film 33, and a second diffuser 34. The first diffuser 31 and the second diffuser 34 are made of a polymer film or the like for diffusing the light. The first light converting film 32 and the second light converting film 33 are prisms which can convert and focus the light.

The first LCD panel 40 is provided on the first optical means 20 and served as the first monitor. On the other side, the second LCD panel 50 is provided on the second optical means 30 and served as the second monitor. According to the present embodiment, there is no reflector 15 provided on the first surface 10a or the second part 10b2 of the second surface 10b, so the light from the light source 12 can be emitted from the first surface 10a and the second part 10b2 of the second surface 10b both. Therefore, both the first LCD panel 40 and the second panel 50 can display images.

Figure 4:
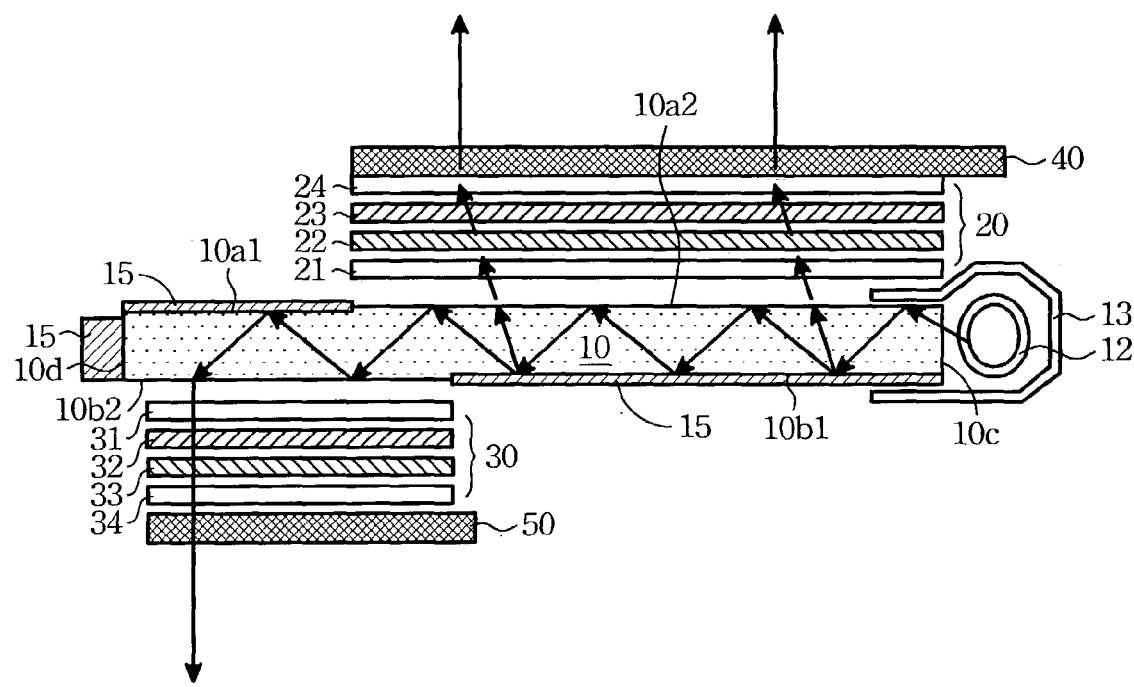
FIG. 4 shows a schematic cross-sectional diagram of the third embodiment of the dual-faceted LCD display of the present invention.

Please refer now to FIG. 4, which is a schematic cross-sectional diagram of the third embodiment of the dual-faceted LCD display of the present invention. The dual-faceted LCD display is composed of a light guide pipe 10, a light source 12, a first optical means 20, a second optical means 30, a first LCD panel 40, and a second LCD panel 50.

The light guide pipe 10 is wedge-shaped or plane, comprising a first surface 10a, a second surface 10b, a first edge 10c, and a second edge 10d. According to the present invention, people can choose whether a reflector 15 is provided on the first surface 10a, the second surface 10b, or the second edge 10d of the light guide pipe 10 or not. In other word, each one of the first surface 10a, the second surface 10b, and the second edge 10d of the light guide pipe 10 is capable and optional of attaching a reflector, depending on people's choice. The light guide pipe 10 is generally made of an acrylic resin or the like, and has a dot pattern formed on its inner surfaces which can make the light from the light source 12 uniform over the first surface 10a and the second surface 10b.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10.

In the third embodiment of the present invention, there is no reflector 15 provided on the second part 10a2 of the first surface 10a or the second part 10b2 of the second surface 10b of the light guide pipe 10. However, on the other hand, one reflector 15 is provided on each of the first part 10a1 of the first surface 10a, the first part 10b1 of the second surface 10b and the second edge 10d of the light guide pipe 10. Therefore, the light from the light source 12 is propagated and reflected repeatedly in the light guide pipe 10, and then emitted over the second part 10a2 of the first surface 10a and the second part 10b2 of the second surface 10b.

The first optical means 20 is provided on the second part 10a2 of first surface 10a of the light guide pipe 10, and applied to make the light emitted from the light guide pipe 10 uniform. The first optical means 20 is generally composed of a first diffuser 21, a first light converting film 22, a second light converting film 23, and a second diffuser 24. The first diffuser 21 and the second diffuser 24 are made of a polymer film or the like for diffusing the light. The first light converting film 22 and the second light converting film 23 are prisms which can convert and focus the light. The second optical means 30 is provided on the second part 10b2 of the second surface 10b of the light guide pipe 10, and applied to make the light emitted from the light guide pipe 10 uniform. The second optical means 30 is generally composed of a first diffuser 31, a first light converting film 32, a second light converting film 33, and a second diffuser 34. The first diffuser 31 and the second diffuser 34 are made of a polymer film or the like for diffusing the light. The first light converting film 32 and the second light converting film 33 are prisms which can convert and focus the light.

The first LCD panel 40 is provided on the first optical means 20 and served as the first monitor. On the other side, the second LCD panel 50 is provided on the second optical means 30 and served as the second monitor. According to the present embodiment, because there is no reflector 15 provided on the second part 10a2 of first surface 10a or the second part 10b2 of the second surface 10b, the light from the light source 12 can be emitted from the second part 10a2 of the first surface 10a and the second part 10b2 of the second surface 10b both. Therefore, both the first LCD panel 40 and the second panel 50 can display images.

Figure 5:
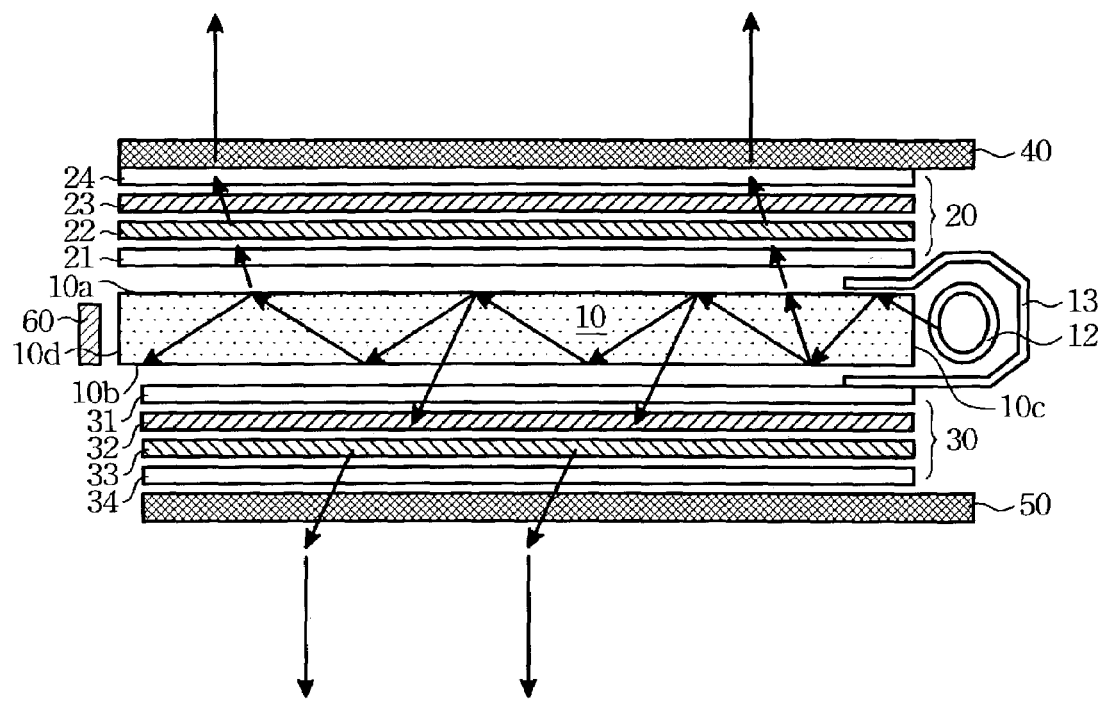
FIG. 5 shows a schematic cross-sectional diagram of the fourth embodiment of the triple-faceted LCD display of the present invention.

Please refer then to FIG. 5, which is a schematic cross-sectional diagram of the fourth embodiment of the triple-faceted LCD display of the present invention. The dual-faceted LCD display of this embodiment is composed of a light guide pipe 10, a light source 12, a first optical means 20, a second optical means 30, a first LCD panel 40, a second LCD panel 50, and a third LCD panel 60.

The light guide pipe 10 is wedge-shaped or plane, comprising a first surface 10a, a second surface 10b, a first edge 10c, and a second edge 10d. According to the present invention, people can choose whether a reflector 15 is provided on the first surface 10a, the second surface 10b, or the second edge 10d of the light guide pipe 10 or not. In other word, each one the first surface 10a, the second surface 10b, and the second edge 10d of the light guide pipe 10 is capable and optional of attaching a reflector, depending on people's choice. The light guide pipe 10 is generally made of an acrylic resin or the like, and has a dot pattern formed on its inner surfaces which can make the light from the light source 12 uniform over the first surface 10a and the second surface 10b of the light guide pipe 10.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10.

In the fourth embodiment of the present invention, there is no reflector 15 provided on the first surface 10a, and there is no reflector 15 provided on the second surface 10b, either. Furthermore, no reflector is provided on the second edge 10d of the light guide pipe 10, either. Therefore, the light from the light source 12 is propagated and reflected repeatedly in the light guide pipe 10, and then emitted over its first surface 10a, its second surface 10b, and its second edge 10d.

The first optical means 20 is provided on the first surface 10a of the light guide pipe 10, and applied to make the light emitted from the light guide pipe 10 uniform. The first optical means 20 is generally composed of a first diffuser 21, a first light converting film 22, a second light converting film 23, and a second diffuser 24. The first diffuser 21 and the second diffuser 24 are made of a polymer film or the like for diffusing the light. The first light converting film 22 and the second light converting film 23 are prisms or the like which can convert and focus the light.

The second optical means 30 is provided on the second surface 10b of the light guide pipe 10, and applied to make the light emitted from the light guide pipe 10 uniform. The second optical means 30 is generally composed of a first diffuser 31, a first light converting film 32, a second light converting film 33, and a second diffuser 34. The first diffuser 31 and the second diffuser 34 are made of a polymer film or the like for diffusing the light. The first light converting film 32 and the second light converting film 33 are prisms which can convert and focus the light.

The first LCD panel 40 is provided on the first optical means 20 and served as the first monitor. On the other side, the second LCD panel 50 is provided on the second optical means 30 and served as the second monitor. The third LCD panel 60 is provided on the second edge 10d of the light guide pipe 10 and served as the third monitor. Furthermore, a third optical means (not shown in the figure) can further be provided between the third LCD panel 60 and the second edge 10d of the light guide pipe 10.

According to the present embodiment, because there is no reflector 15 provided on the first surface 10a, the second surface 10b or the second edge 10d, the light from the light source 12 can be emitted from the first surface 10a, the second surface 10b, and the second edge 10d. Therefore, each one of the first LCD panel 40, the second panel 50, and the third panel 60 can display images.

Figure 6:
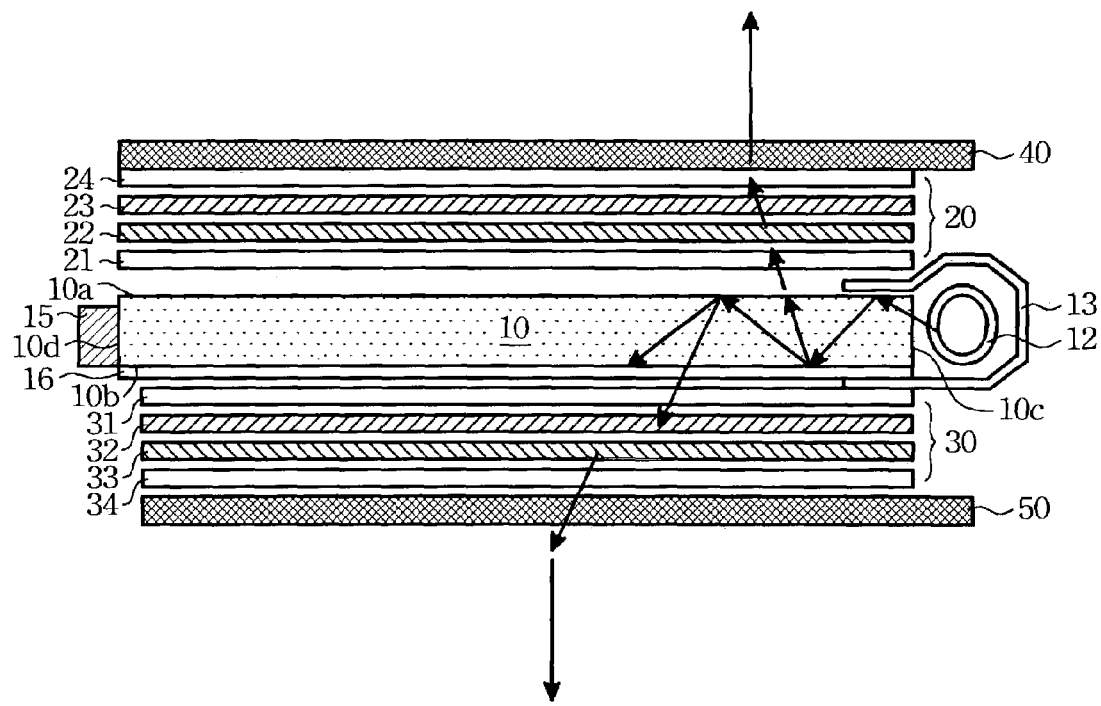
FIG. 6 shows a schematic cross-sectional diagram of the fifth embodiment of the dual-faceted LCD display of the present invention.

Please refer finally to FIG. 6, which is a schematic cross-sectional diagram of the fifth embodiment of the dual-faceted LCD display of the present invention. The dual-faceted LCD display is composed of a light guide pipe 10, a light source 12, a first optical means 20, a second optical means 30, a first LCD panel 40, and a second LCD panel 50.

The light guide pipe 10 is wedge-shaped or plane, comprising a first surface 10a, a second surface 10b, a first edge 10c, and a second edge 10d. According to the present invention, people can choose whether a reflector 15 is provided on the first surface 10a, the second surface 10b, or the second edge 10d of the light guide pipe 10 or not. In other word, each one of the first surface 10a, the second surface 10b, and the second edge 10d of the light guide pipe 10 is capable and optional of attaching a reflector, depending on people's choice. The light guide pipe 10 is generally made of an acrylic resin or the like, and has a dot pattern formed on its inner surfaces which can make the light from the light source 12 uniform over the first surface 10a and the second surface 10b.

The light source 12, which is a cold fluorescent lamp or any other light emitter such as LED, is provided at the first edge 10c of the light guide pipe 10. The lamp reflector 13 is applied to cover the light source 12 and reflect the light into the light guide pipe 10.

In the fifth embodiment of the present invention, there is no reflector 15 provided on the first surface 10a, but there is one reflector provided on the second edge 10d of the light guide pipe 10. Particularly, one semi-opaque reflector 16 is provided on the second surface 10b of the light guide pipe 10. Therefore, the light from the light source 12 is propagated and reflected repeatedly in the light guide pipe 10, and emitted over its first surface 10a and second surface 10b both.

The first optical means 20 is provided on the first surface 10a of the light guide pipe 10, and applied to make the light emitted from the light guide pipe 10 uniform. The first optical means 20 is generally composed of a first diffuser 21, a first light converting film 22, a second light converting film 23, and a second diffuser 24. The first diffuser 21 and the second diffuser 24 are made of a polymer film or the like for diffusing the light. The first light converting film 22 and the second light converting film 23 are prisms or the like which can convert and focus the light.

The second optical means 30 is provided on the second surface 10b of the light guide pipe 10, and applied to make the light emitted from the light guide pipe 10 uniform. The second optical means 30 is generally composed of a first diffuser 31, a first light converting film 32, a second light converting film 33, and a second diffuser 34. The first diffuser 31 and the second diffuser 34 are made of a polymer film for diffusing the light. The first light converting film 32 and the second light converting film 33 are prisms or the like which can convert and focus the light.

The first LCD panel 40 is provided on the first optical means 20 and served as the first monitor. On the other side, the second LCD panel 50 is provided on the second optical means 30 and served as the second monitor. According to the present embodiment, because there is no reflector 15 provided on the first surface 10a but there is one semi-opaque reflector 16 provided on the second surface 10b of the light guide pipe 10, the light from the light source 12 can be emitted from the first surface 10a and the second surface 10b both. Therefore, both the first LCD panel 40 and the second panel 50 can display images.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A backlight device of a LCD display, comprising:
    a single light guide pipe, which comprises a first surface, and a second surface, wherein the first surface is opposite to the second surface;
    a reflector, selectively attached to the light guide pipe;
    a light source, which is capable of generating and emitting a light into said light guide pipe;
    a first optical means, which is provided on said first surface of said light guide pipe; and
    a second optical means, which is provided on said second surface of said light guide pipe;
    wherein the light is emitted over the first surface and the second surface and passes the first optical means and the second optical means.

2. The backlight device of a LCD display of claim 1, wherein both said first optical means and said second optical means are composed of a first diffuser, a first light converting film, a second light converting film, and a second diffuser.

3. The backlight device of a LCD display of claim 1, wherein said second surface comprises at least a first and a second part, and said reflector is provided on only said first part of said second surface of said light guide pipe, and there is no reflector provided on either said second part of said second surface or said first surface of said light guide pipe.

4. The backlight device of a LCD display of claim 1, wherein said first surface comprises at least a first and a second part, and said reflector is provided on only said first part of said first surface of said light guide pipe, and there is no reflector provided on either said second part of said first surface or said second surface of said light guide pipe.

5. The backlight device of a LCD display of claim 1, wherein said first surface comprises at least a first and a second part, said second surface comprises at least a first and a second part, and said reflector is provided on only said first part of said first surface of said light guide pipe, and another reflector is provided on only said first part of said second surface of said light guide pipe, and there is no reflector provided on either said second part of said first surface or said second part of said second surface of said light guide pipe.

6. The backlight device of a LCD display of claim 1, wherein there is one semi-opaque reflector provided on said second surface of said right guide pipe, but there is no reflector provided on said first surface of said light guide pipe.

7. A many-faceted LCD display, comprising:
   a single light guide pipe, which comprises a first surface, a second surface, a first edge, and a second edge;
   a reflector, selectively attached to the light guide pipe;
   a light source, which is provided at said first edge and capable of generating and emitting light into said light guide pipe;
   a first optical means, which is provided on said first surface of said light guide pipe;
   a second optical means, which is provided on said second surface of said light guide pipe;
   a first LCD panel, which is provided on said first optical means; and
   a second LCD panel, which is provided on said second optical means,
   wherein the light is emitted over the first surface and the second surface and passes the first optical means, the second optical means, the first LCD panel and the second LCD panel.

8. The many-faceted LCD display of claim 7, wherein both said first optical means and said second optical means are composed of a first diffuser, a first light converting film, a second light converting film, and a second diffuser.

9. The many-faceted LCD display of claim 7, wherein there is no reflector provided on said first surface or said second surface of said light guide pipe.

10. The many-faceted LCD display of claim 7, wherein said second surface comprises at least a first and a second part, and said reflector is provided on only said first part of said second surface of said light guide pipe, and there is no reflector provided on either said second part of said second surface or said first surface of said light guide pipe.

11. The many-faceted LCD display of claim 7, wherein said first surface comprises at least a first and a second part, and said reflector is provided on only said first part of said first surface of said light guide pipe, and there is no reflector provided on either said second part of said first surface or said second surface of said light guide pipe.

12. The many-faceted LCD display of claim 7, wherein said first surface comprises at least a first and a second part, said second surface comprises at least a first and a second part, and said reflector is provided on only said first part of said first surface of said light guide pipe, and another reflector is provided on only said first part of said second surface of said light guide pipe, and there is no reflector provided on either said second part of said first surface or said second part of said second surface of said light guide pipe.

13. The many-faceted LCD display of claim 7, wherein there is one semi-opaque reflector provided on said second surface of said light guide pipe, but there is no reflector provided on said first surface of said light guide pipe.

14. The many-faceted LCD display of claim 7, further comprising a third LCD panel, which is provided on said second edge.

15. The many-faceted LCD display of claim 14, further comprising a third optical means, which is provided between said third LCD panel and said second edge of said light guide pipe.

16. A backlight device of a LCD display, comprising:
   a light guide pipe, which comprises a first surface, and a second surface, wherein the first surface is opposite to the second surface;
   a light source, which is capable of generating and emitting a light into said light guide pipe;
   a first optical means, which is provided on said first surface of said light guide pipe; and
   a second optical means, which is provided on said second surface of said light guide pipe,
   wherein the light is emitted over the first surface and the second surface and passes the first optical means and the second optical means, and
   both said first optical means and said second optical means are composed of a first diffuser, a first light converting film, a second light converting film, and a second diffuser.

17. A many-faceted LCD display, comprising:
   a light guide pipe, which comprises a first surface, a second surface, a first edge, and a second edge;
   a light source, which is provided at said first edge and capable of generating and emitting light into said light guide pipe;
   a first optical means, which is provided on said first surface of said light guide pipe; and
   a second optical means, which is provided on said second surface of said light guide pipe;
   a first LCD panel, which is provided on said first optical means; and
   a second LCD panel, which is provided on said second optical means,
   wherein the light is emitted over the first surface and the second surface and passes the first optical means, the second optical means, the first LCD panel and the second LCD panel, and
   both said first optical means and said second optical means are composed of a first diffuser, a first light converting film, a second light converting film, and a second diffuser.

* * * * *